(12) United States Patent
Parakhin et al.

(10) Patent No.: US 9,864,817 B2
(45) Date of Patent: Jan. 9, 2018

(54) DETERMINATION OF RELATIONSHIPS BETWEEN COLLECTIONS OF DISPARATE MEDIA TYPES

(75) Inventors: Mikhail Parakhin, Redmond, WA (US); Dmitry Korolev, Bellevue, WA (US); Alexey Poyarkov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/360,664

(22) Filed: Jan. 28, 2012

(65) Prior Publication Data

US 2013/0198186 A1 Aug. 1, 2013

(51) Int. Cl.
G06F 17/30 (2006.01)
(52) U.S. Cl.
CPC .............. *G06F 17/30979* (2013.01)
(58) Field of Classification Search
CPC ........... G06F 17/3001; G06F 17/30386; G06F 17/30424; G06F 17/30592; G06F 2216/03
USPC .................................................. 707/737, 748
See application file for complete search history.

(56) References Cited

U.S. PATENT DOCUMENTS

| | | | |
|---|---|---|---|
| 6,301,584 B1 | 10/2001 | Ranger | |
| 6,990,238 B1 * | 1/2006 | Saffer et al. | ............ 382/224 |
| 7,299,222 B1 | 11/2007 | Hogan et al. | |
| 7,386,545 B2 | 6/2008 | Ashutosh et al. | |
| 7,617,202 B2 | 11/2009 | Brill et al. | |
| 7,657,522 B1 | 2/2010 | Puzicha et al. | |
| 7,685,141 B2 | 3/2010 | Jadhav et al. | |
| 7,761,436 B2 | 7/2010 | Norton et al. | |
| 7,765,236 B2 | 7/2010 | Zhai et al. | |
| 7,769,740 B2 | 8/2010 | Martinez et al. | |
| 7,814,085 B1 | 10/2010 | Pfleger et al. | |
| 7,818,315 B2 | 10/2010 | Cucerzan et al. | |
| 8,024,331 B2 | 9/2011 | Calistri-Yeh et al. | |
| 8,145,618 B1 | 3/2012 | Pfleger et al. | |
| 8,224,857 B2 | 7/2012 | Doganata et al. | |
| 8,627,270 B2 | 1/2014 | Fox et al. | |

(Continued)

FOREIGN PATENT DOCUMENTS

WO 2008037848 A1 9/2007
WO WO 2008/037848 A1 * 9/2007

(Continued)

OTHER PUBLICATIONS

Search Engine Research Papers, 2004 Brandway Corp., Jul. 2, 2005, downloaded Feb. 24, 2010, http://search-engine--optimization.ecommercehosts.com/SEO-referenceslresearchnaners. htm, 14 pages.

(Continued)

*Primary Examiner* — Heather Herndon
*Assistant Examiner* — Soheila (Gina) Davanlou
(74) *Attorney, Agent, or Firm* — The Law Office of Michael E. Kondoudis

(57) ABSTRACT

Architecture that automatically determines relationships between vector spaces of disparate media types, and outputs ranker signals based on these relationships, all in a single process. The architecture improves search result relevance by simultaneously clustering queries and documents, and enables the training of a model for creating one or more ranker signals using simultaneous clustering of queries and documents in their respective spaces.

20 Claims, 7 Drawing Sheets

(56) References Cited

U.S. PATENT DOCUMENTS

| | | | |
|---|---|---|---|
| 2002/0069218 A1* | 6/2002 | Sull | G06F 17/30796 715/202 |
| 2002/0194201 A1 | 12/2002 | Wilbanks et al. | |
| 2003/0101164 A1* | 5/2003 | Pic et al. | 707/1 |
| 2003/0220913 A1 | 11/2003 | Doganata et al. | |
| 2004/0034633 A1* | 2/2004 | Rickard | G06F 17/30864 |
| 2005/0222977 A1 | 10/2005 | Zhou et al. | |
| 2005/0234952 A1* | 10/2005 | Zeng | G06F 17/30631 |
| 2006/0005124 A1 | 1/2006 | Speicher | |
| 2006/0047673 A1 | 3/2006 | Molander et al. | |
| 2006/0212362 A1 | 9/2006 | Donsbach et al. | |
| 2007/0038616 A1 | 2/2007 | Guha | |
| 2007/0094171 A1* | 4/2007 | Burges et al. | 706/16 |
| 2007/0233656 A1 | 10/2007 | Bunescu et al. | |
| 2008/0005118 A1 | 1/2008 | Shakib et al. | |
| 2008/0082506 A1 | 4/2008 | Saito et al. | |
| 2008/0215543 A1 | 9/2008 | Huang et al. | |
| 2008/0222105 A1 | 9/2008 | Matheny | |
| 2008/0306808 A1 | 12/2008 | Adjali et al. | |
| 2009/0089083 A1 | 4/2009 | Paradis et al. | |
| 2009/0144609 A1 | 6/2009 | Liang et al. | |
| 2009/0171813 A1 | 7/2009 | Byrne et al. | |
| 2009/0182725 A1 | 7/2009 | Govani et al. | |
| 2009/0265338 A1 | 10/2009 | Kraft et al. | |
| 2009/0319508 A1* | 12/2009 | Yih et al. | 707/5 |
| 2010/0050211 A1 | 2/2010 | Seldin et al. | |
| 2010/0098343 A1* | 4/2010 | Perronnin et al. | 382/224 |
| 2010/0179874 A1* | 7/2010 | Higgins et al. | 705/14.53 |
| 2010/0198837 A1 | 8/2010 | Wu et al. | |
| 2010/0235340 A1 | 9/2010 | Todhunter et al. | |
| 2010/0293195 A1 | 11/2010 | Houghton | |
| 2011/0004529 A2 | 1/2011 | Finn et al. | |
| 2011/0075950 A1* | 3/2011 | Ohashi | 382/305 |
| 2011/0078554 A1 | 3/2011 | Nie et al. | |
| 2011/0103699 A1 | 5/2011 | Ke et al. | |
| 2011/0106782 A1 | 5/2011 | Ke et al. | |
| 2011/0106798 A1 | 5/2011 | Li et al. | |
| 2011/0119270 A1* | 5/2011 | Jin et al. | 707/737 |
| 2011/0137910 A1* | 6/2011 | Hibino et al. | 707/741 |
| 2011/0208724 A1 | 8/2011 | Jones et al. | |
| 2011/0225155 A1 | 9/2011 | Roulland et al. | |
| 2011/0252012 A1 | 10/2011 | Kanduri et al. | |
| 2011/0270674 A1 | 11/2011 | Cosman | |
| 2011/0283205 A1 | 11/2011 | Nie et al. | |
| 2011/0295775 A1 | 12/2011 | Wang et al. | |
| 2011/0299743 A1 | 12/2011 | Ke et al. | |
| 2011/0314026 A1* | 12/2011 | Pickens | G06F 17/30634 707/741 |
| 2012/0011112 A1* | 1/2012 | Bian | G06F 17/30864 707/723 |
| 2012/0263386 A1* | 10/2012 | Schlosser et al. | 382/218 |
| 2012/0303664 A1* | 11/2012 | Apacible et al. | 707/780 |
| 2013/0110849 A1* | 5/2013 | Morris et al. | 707/749 |
| 2013/0124483 A1* | 5/2013 | Furuhashi et al. | 707/661 |

FOREIGN PATENT DOCUMENTS

| | | |
|---|---|---|
| WO | 2009/052277 A1 | 4/2009 |
| WO | 2011054002 A2 | 5/2011 |
| WO | 2011143154 A2 | 11/2011 |

OTHER PUBLICATIONS

Filter Search Results, 2010 Google. downloaded Feb. 24, 2010 httn:/1 www.lmof!le.com/suuDortiadulannerlbinlanswer.Dv?hl=en &answer=98223 1 page.

Lv et al., "Perret: AToolkit for Content-Based Similarity Search ofFeature-Rich Data," EuroSys.'06, Apr. 18-21, 2006, Leuven, Belgium, http://www.cs.prlnceton.edulcass/papers/Ferret.pdf, 14 pages.

Yu-Feng, et al., —Improving Information Retrieval System by Co-clustering Web Documents and Queries, Retrieved at <<http://www.aicit.org/aisslppllAISS%20vol3%20issue8_32.pdf>>,Proceedings of Advances in Information Sciences and Service Sciences (AISS), vol. 3, No. 8, Sep. 2011.

Wen, et al., "Query Clustering in the Web Context", Retrieved at <<http://research.microsoft.comJen-uslumJpeople/jrwenljrwen_fileslpublicationslQC-CIR.pdf>>, 2002.

Bian, et al., "Ranking Specialization for Web Search: A Divide-and-Conquer Approach by Using Topical RankSVM"Retrieved at <<ht1p:lllabs.yahoo.com/files/fpOB42-bian.pdf>>, Apr. 26-30, 2010.

Lee, et al., "Ke-ranJ<mg moael Dasea on aocument Clusters", Ketnevea at <<nttp:llwww.google.co.InJum' sa=t&rct=j&q=re-ranking%20model%20based%200n%20documentok2Oclusters &source=web&cd=1 &ved=OCBwQFjAA &url=http%3A%2F%2Fciteseerx.ist.psu. edu%2Fviewdoc%2Fdownload%3Fdo%3D10.1.1.94. 9049%26rep%3Drep1%26type% undated3Dpdf &ei=nePFTo6NCBK4rAeCqY37Cw &usg=AFQJCNFAKMIZJQIgee8kce8jscjORznDGw>>.

Puppin, et al., "The QueryVector Document Modell" Retrieved at <<http://hpc.istLcnr.itl-diego/paperslcikm472-puppin.pdf>>, Nov. 5-11, 2006.

Dai, et al., Learning to Rank for Freshness and Relevancell, Retrieved at <<http://research.microsoft.com/pubsl150747/Dai2011.pdf>>, Jul. 24-28, 2011.

International Search Report, dated Apr. 8, 2013, received in Application No. PCT/US20121069604.

Bouquet, et al., "An Entity Name System for linking Semantic Web Data", Retrieved at <<hUp:llciteseerx.islpsu.edu/viewdocldownload?doi=10.1.1.128.2714&rep=rep1&type=pdf>>, Atti di: Linked Data on the Web (LDOW), Apr. 22, 2008, pp. 10.

Chakrabarti, et al., "Enhancing Search with Structure", Retrieved at <<http://sites.computer.org/debull/A10mar/soumen-paper.pdf>>, Bulletin of the IEEE Computer Society Technical Committee on Data Engineering, 2010. pp. 1-13.

Tsoukalas, et al., "PLEDS: A Personalized Entity Detection System Based on Web Log Mining Techniques", Retrieved at <<hUp:llleeexplore.Ieee.org/slamp/slamp.jsp?tp= &arnumber=4597039>>, The Ninth International Conference on Web-Age Information Management (WAIM), Jul. 20-22, 2008, pp. 389-396.

"Visual-Cue Refinement of User Query Results", U.S. Appl. No. 12/890,097, filed Sep. 24, 2010, pp. 28.

"Multi-Modal Approach to Search Query Input", U.S. Appl. No. 12/940,538, filed Nov. 5, 2010, pp. 44.

"Language Identification in Multilingual Text Background", U.S. Appl. No. 12/904,642, filed Oct. 14, 2010, pp. 30.

"An Interactive Framework for Name Disambiguation", U.S. Appl. No. 13/118,404, filed May 28, 2011, pp. 40.

International Search Report, dated Mar. 29, 2013, received in peT Application No. PCT/US20124/061241.

L1, et al., "EntityEngine: Answering Entity-Relationship Queries using Shallow Semantics", Retrieved at <<http://www.eecs.umich.edul-congylworklcikm10demo.pdf>>, Proceedings of the 19th ACM Conference on Information and Knowledge Management. Oct. 26-30, 2010, pp. 2.

Demartini, et al., "A Model for Ranking Entities and Its Application to Wikipedia". Retrieved at <<http://www.l3s.deJ.web/uploaclldocuments/111aweb08.pdf>>, Proceedings of the Latin American Web Conference, LA-WEB, Oct. 28-30, 2008, pp. 10.

Aleman-Meza. et at. "Ranking Complex Relationships on the Semantic Web". Retrieved at <<http://ieeexploreJeee.org/stamp/stamp.jsp?amumber=01438303>>, IEEE Internet Computing. vol. 9, No. 3, May 2005. pp. 37-44.

Milton, et al., "On the Study of Data Modelling Languages using Chisholm's Ontology" Retrieved at <<http://citeseerx.ist.psu.edulviewdocJdownload?doi=1O.1.1.83.4956 &rep=rep1Mype=pdf>>, In Information Modelling and Knowledge Bases XIII, 2002, pp. 18.

Waitelonis, et al., "Semantically Enabled Exploratory Video Search", Retrieved at http://km.aifb.kit.edulws/semsearch10lFileslvideo.pdf>>, Semantic Search 2010 Workshop, Apr. 26-26, 2010, pp. 8.

(56) References Cited

OTHER PUBLICATIONS

"Supplementary Search Report Issued in European Patent Application No. 12845944.3", dated May 4, 2015, 8 Pages.

Kopliku, et al., "Towards a Framework for Attribute Retrieval", In Proceedings of the 20th ACM Conference on Information and Knowledge Management, Oct. 24, 2011, 10 Pages.

McCown, et al., "Agreeing to Disagree: Search Engines and Their Public Interfaces", In Proceedings of the 7th Joint Conference on Digital Libraries, Jun. 17, 2007, 10 Pages.

Gerbolya, et al., "Web Application", Published on: Oct. 11, 2011, Available at: http://en.wikipedia.org/w/index.php?title=web_application&oldid=455096181.

Internet Search Results from the Association for Computing Machinery Digital Library, retrieved Nov. 9, 2016 in U.S. Appl. No. 13/340,722.

Internet Search Results from the Google Scholar Search Engine, retrieved Nov. 9, 2016 in U.S. Appl. No. 13/340,722.

Internet Search Results from Institute of Electrical and Electronics Engineers (IEEE) Xplore Digital Library, retrieved Nov. 9, 2016 in U.S. Appl. No. 13/340,722.

Yu-Feng et al., "Improving Information Retrieval System by Co-clustering Web Documents and Queries", Retrieved at <<http://www.aicit.org/aiss/ppl/AISS%20vol3%20issue8_32.pdf>>, Proceedings of Advances in Information Sciences and Service Sciences (AISS), vol. 3, No. 8, Sep. 2011.

Wen, et al., "Query Clustering in the Web Context", Retrieved at <<http://research.microsoft.com/en-us/um/people/jrwen/jrwen_files/publications/QC-CIR.pdf>>, 2002.

Bian, et al., "Ranking Specialization for Web Search: A Divide-and-Conquer Approach by Using Topical RankSVM", Retrieved at <<http://labs.yahoo.com/files/fp0842-bian.pdf>>, Apr. 26-30, 2010.

Lee, et al., "Re-ranking model based on document clusters", Retrieved at <<http://www.google.co.in/url?sa=t&rct=J&q=re-ranking%20model%20based%20on%20document%20clusters&source=web&cd=1&ved=0CBwQFjAA&url=http%3A%2F%2Fciteseerx.ist.psu.edu%2Fviewdoc%2Fdownload%3Fdoi%3D10.1.1.94.9049%26rep%3Drep1%26type%3Dpdf&ei=nePFTo6NC8K4rAeCqY37Cw&usg=AFQjCNFAKMIZJQI9ee8kce8jscj0RznDGw>>, Proceedings of Apr. 26, 1999.

Puppin, et al., "The QueryVector Document Model", Retrieved at <<http://hpc.isti.cnr.it/~diego/papers/cikm472-puppin.pdf>>, Nov. 5-11, 2006.

Dai, et al., "Learning to Rank for Freshness and Relevance", Retrieved at <<http://research.microsoft.com/pubs/150747/Dai2011.pdf>>, Jul. 24-28, 2011.

\* cited by examiner

DETERMINATION OF RELATIONSHIPS BETWEEN COLLECTIONS OF DISPARATE MEDIA TYPES

BACKGROUND

The enormity in the amounts and types of data in all aspects of local and server systems continues to increase in at a never-ending pace. In the search domain, the effectiveness and efficiency of search engines, for example, become critical components in finding the desired information. Techniques employed to improve the quality of the search engine include improvements in the ranking algorithms. In other domains such as for advertisement recommendations and personalized recommendations, for example, the handling and processing of disparate media types is also a challenge.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture automatically determines relationships between vector spaces of disparate media types, and outputs ranker signals based on these relationships, all in a single process. One problem to solve is to provide the existing ranking algorithm with more features, which are sufficiently general to be used to improve the relevance of the results returned by the search engine. One or more ranker signals are created by training a model by simultaneous clustering (co-clustering) of queries and documents, in query and document spaces, respectively.

In addition to relationship processing between the vector spaces, other disclosed techniques include a co-clustering approach, automatic identification of clusters of similar queries and documents which are relevant to each other, and co-clustering driven dimensionality reduction of the query and/or document spaces.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
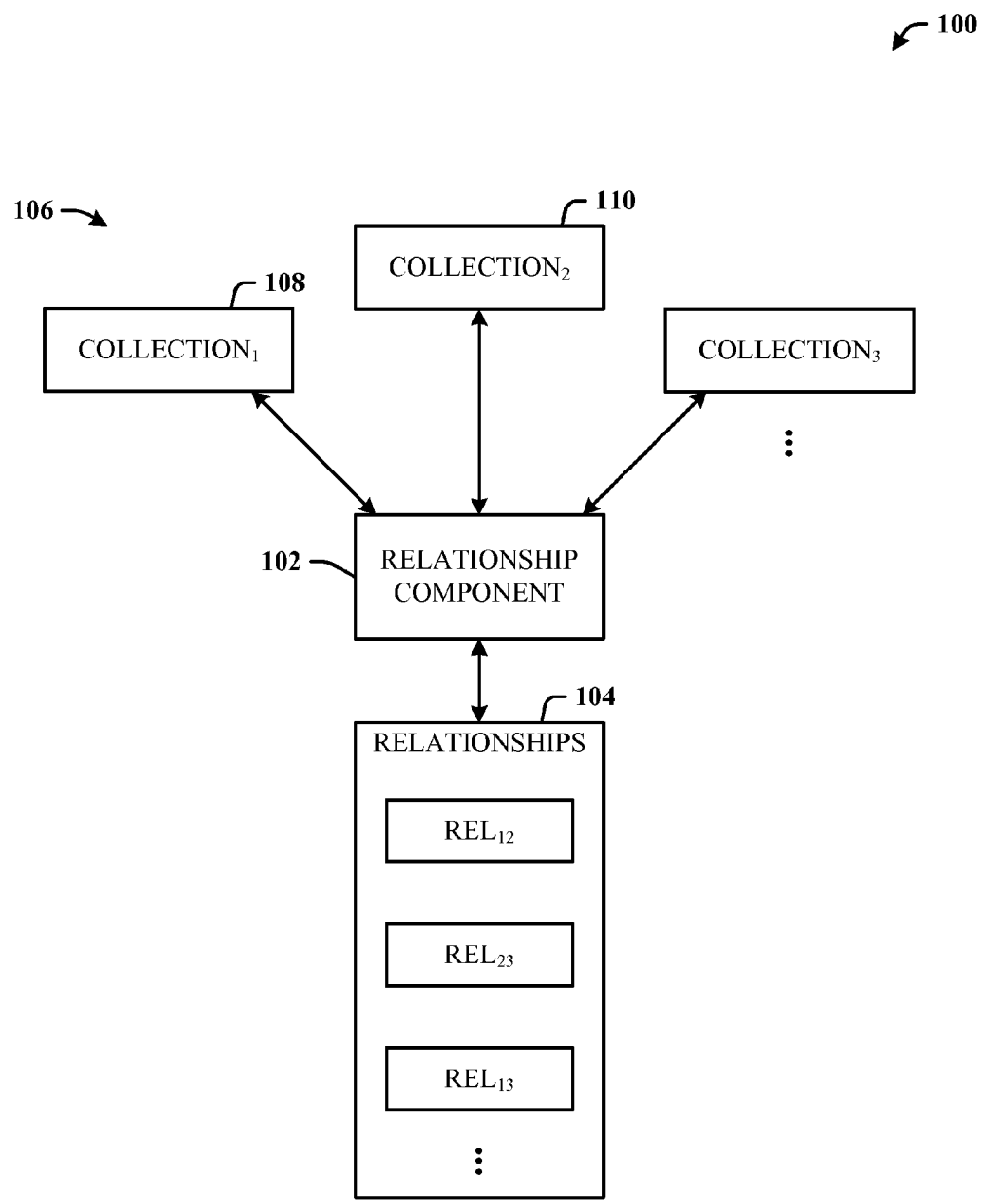
FIG. 1 illustrates a system in accordance with the disclosed architecture.

The disclosed architecture automatically determines relationships between vector spaces of disparate media types as part of an offline model creation process, and uses these model relationships in an online process. The architecture operates with two completely different feature spaces, such as for example, "query as text" versus "image as pixels"; however, it is to be understood that the architecture can work on any other cross-media data as well.

In the offline process, the architecture also concurrently creates collections of queries and collections of documents. This can be accomplished using clustering techniques, for example. Moreover, the collections and relationships are all computed in a single process. Concurrent clustering is described in an embodiment herein; however, it is to be appreciated that other methods can be utilized to achieve a similar result (e.g., in terms of the same or slightly different cost function) without running the "simultaneous clustering" technique.

One benefit of the offline models is to then output ranker signals for the online process based on these relationships for input to a ranker algorithm. The ranker algorithm orders the search results (e.g., the image search results on a search engine images). One signal being produced by the model described herein shows the improvement of the overall ranking metric performance. For example, if taking relevance as the ranker quality metric, the relevance of the ranker algorithm improves once the signal produced by the training is being used among the other ranking signals.

The architecture supports the improvement in query time search result relevance by employing an offline model creation technique that simultaneously clusters queries and documents, and enables the training of a model for creating a family of ranker signals (for online processing) using the simultaneous clustering of queries and documents in their respective spaces. Thus, the architecture discloses at least an offline co-clustering approach, automatic identification of clusters of similar queries and documents, which are relevant to each other, and co-clustering driven dimensionality reduction of the query and/or document spaces.

Generally, a cost function is constructed for offline model training that predicts some truth. The truth for the ranker algorithm can be developed using human-labeled data (e.g., "Document D is relevant for query Q") or user engagement data (e.g., "We know that the users tend to view/click on the document D for query Q"), either or both of which can be used. The form of the model can be optimized to then optimize the cost function.

The cost function minimizes the cross-entropy or, almost equivalently, to minimize the KL (Kullback-Leibler) divergence, between the observed "truth" labels on the pairs of documents from two spaces and the labels predicted by the model. The labels can be the human judgments, as previously indicated, the user interaction data, or any other source of information employed in the model for prediction purposes.

Offline components of the architecture further include query-level clustering parameters which describe how the queries are converted into an N-dimensional vector; document-level clustering parameters which describe how the documents are converted into an M-dimensional vector; and, query-cluster-to-document-cluster transition parameters which describe the expected relevancy (relationship) of a document having an associated document cluster distribution to the query having an associated query cluster distribution.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The model training phase (offline) of system 100 can include a relationship component 102 that automatically determines relationships 104 between disparate collections 106 of media types. That is, a collection 108 includes items of a media type (e.g., text) that is different than the media type (e.g., images) of items of a second collection 110, and so on. The collections 106 and relationships 104 are computed in a single process, such as part of processing a query to return documents as results.

As defined herein, the term "document" includes one or more of media types such as text, audio, video, image, and so on. Similarly, the query can be of the same types of media, although the disclosed architecture operates optimally on the more complex scenarios where the query media type is different than the document media type. Accordingly, the query is of a media type that is different from a media type of the documents. The collections 106 are clusters that are concurrently created as query clusters and document clusters, and the relationship component 102 computes the relationships 104 between the query clusters and document clusters.

The relationship component 102 computes vectors for each of query collections and document collections, and elements of the vectors are probabilistic data that a given query and document belong to a common collection. The vectors include query vectors and document vectors generated based on a collection-wise probabilistic algorithm, the query vectors and document vectors processed with a similarity function to create a combined model of query-document labeled data. The relationship component 102 employs a cost function that defines the relationships based on truth data. The relationship component 102 computes a total weight of each query in a query collection, and a probability that the query belongs in a given query collection. The relationship component 102 computes a total weight of each document in a document collection, and a probability that the document belongs in a given document collection. The disparate collections include a text media type as the query and an image media type as the documents.

Figure 2:
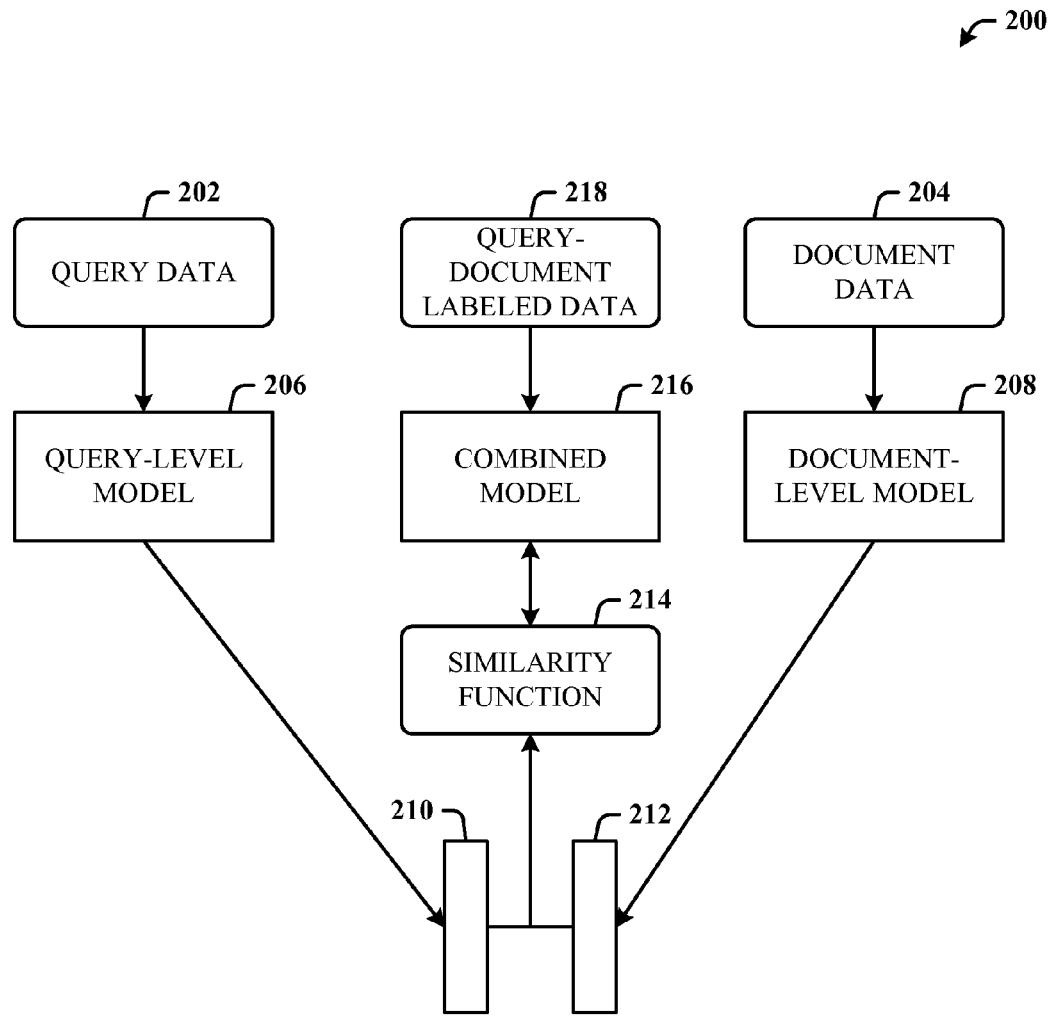
FIG. 2 illustrates a system of query and document processing into a combined query-document model using clusters.

FIG. 2 illustrates an offline model generation system 200 of query and document processing into a combined query-document model using concurrent clustering. The system 200 receives training data in the form of query data 202 and document data 204. The query data 202 is used to create a query-level model 206, and the document data 204 is used to create a document-level model 208. The query-level model 206 can be created using logistic regression on the set of query words. The document-level model 208 can be created as a set of Gaussians in Mahalonobis metric space.

From the query-level model 206 are created query vectors 210, and from the document-level model 208 are created document vectors 212 both in cluster-wise probabilistic spaces. The vectors (210 and 212) are then processed through a similarity function 214 (e.g., a dot product of the probabilistic spaces). The output of the similarity function 214 is used to create a combined model 216 with query-document labeled data 218. The combined model 216 can be created using cross-entropy processing and KL-divergence, for example.

Following is a description of the offline portion of the disclosed architecture, in terms of the disparate media types being a text search query for an image, and image documents returned as the results; however, it is to be understood that the description also applies generally to other media types with disparity between the query and the document results. Additionally, the following example embodiment is in terms of clustering; however, it is to be understood that other grouping techniques can alternatively be implemented.

With respect to simultaneous (or concurrent) clustering, the number N of clusters can be fixed. The queries and the documents, coming from different media types, can be projected into the probabilistic space of N clusters. More specifically, two different functions are provided that map the queries and documents into a simplex of dimension N. Two functions, f(query) and g(document) are introduced, such that, f: query→$\{u_1, u_2 \ldots u_N\}$, i=1 ... N: $u_i \geq 0$, $\Sigma_{i=1}^{N} u_i = 1$
g: document→$\{v_1, v_2 \ldots v_N\}$, i=1 ... N: $v_i \geq 0$, $\Sigma_{i=1}^{B} v_i = 1$ With respect to query space, the "query" is the collection of words. A fixed vocabulary of words is introduced—the words which are present in the queries used as the training data, at least K=3 times. The vocabulary includes M words, which are then enumerated from 1 to M. For the sake of simplicity, punctuation is removed and all the words are converted into lower case.

Using this vocabulary, each query is mapped into a (possibly empty) subset of the [1 ... M] integers. For example, if the word "blue" has the index 10, the word "bmw" has the index 20, and the word "m3" is not present in the vocabulary, the query "blue bmw m3" can map into the {10, 20} set of integers. The order of the numbers in this set is not significant, and duplicate words are discarded so that each number presents in the final mapping, at most once.

Additionally, a logistic regression model is introduced. The query-level model can comprise N*M parameters, where parameter[i=1 ... N][j=1 ... M] describes the "score" of the word of index j in query cluster i. The parameter values are rational numbers of any sign. For example, the word with index 10 ("blue") may have a weight +0.5 in cluster 1, −0.2 in cluster 2 and zeroes in all other clusters. The word with index 20 ("bmw") may have a weight +1.2 in cluster 1, −0.3 in cluster 2, and zeroes in all other clusters.

The weights matrix enables the computation of the "total weight" of each query in each cluster. This is achieved by summing the weights of the words present in the query, for each cluster. Thus, the query "blue bmw m3" has a weight +1.7 (0.5+1.2) in cluster 1, weight −0.5 (−0.2−0.3) in cluster 2, and weight 0, in all the other clusters.

$$w = \{w_1, w_2 \ldots w_N\}$$

$$w_c = \sum_{t \in terms(query)} WeightOfTermInCluster(t, c)$$

where the weights w are $w_1, w_2 \ldots w_N$. Translating from weights to probabilities, the probability of the query belonging to certain cluster i is:

$$f(i) = \frac{e^{w_i}}{\sum_{j=1}^{N} e^{w_j}}$$

The probabilities defined this way have the desired properties of being non-negative for each cluster and sum up to one across all the clusters.

As previously indicated, the documents in the instant problem description are images. The image is, in essence, a collection of pixels, each pixel having its own color (e.g., RGB (red, green, blue)) intensity components. However, processing the image on a pixel level basis is less than efficient for the disclosed purposes. The second-order image feature, however, is more efficient, and is the function which converts the collection of pixels into one or more numbers.

The example second-order image features can include, for example, a color histogram (the fraction of the image which is of a certain color), the number of faces on the image (using a face detection algorithm), contrast distribution (contrast characteristics of the image), average intensity of the upper left quarter of the image (dark vs. bright), dominant gradient direction of the upper left quarter of the image (which direction—"horizontal", "vertical" or "diagonal"—is dominant in the upper left quarter of the image), a histogram of gradients of the certain part of the image. etc.

After the second-order image features are computed, using any number of conventional techniques to convert the matrix of pixels into some numbers ("features") that describe the image corresponding to this matrix of pixels, there can be on the order of a thousand features describing the image. Most features are positive rational numbers, some can be negative rational numbers (e.g., the gradient may be positive to describe the direction to the right and negative to describe the direction to the left), some can be integers (e.g., the number of faces).

A property of the second-order image-level features used herein is that the features are invariant with respect to the image size. In other words, the feature set can be the same (module machine precision) for the image X and the image 2X, where 2X is the image X scaled by a factor of two in both horizontal and vertical directions.

The vector containing the second-order image-level features is converted into the vector of probabilities of the image belonging to the certain cluster. As previously indicated, the probability of each image belonging to each cluster can be a non-negative number, and for each image, the sum of probabilities of the image belonging to each cluster, is one.

To convert the second-order image-level features into probabilities, each image is assigned the weight in each cluster, and the same exponentiation technique is used as in the queries space.

The weight of the image in the cluster is computed as its sum over the set of Gaussians describing this image cluster. The Gaussians in multidimensional space are described by their center, height and width as:

$$p(x) = GaussianHeight \cdot e^{-\frac{\|x - GaussianCenter\|_2}{GaussianWidth^2}}$$

The above formula uses the L2 norm as the distance metric. To increase the flexibility in the model, the squared Mahalonobis distance can be employed instead:

$$p(x) = GaussianHeight \cdot e^{-(\vec{x} - \overrightarrow{GaussianCenter})^T GaussianMatrix^{-1}(\vec{x} - \overrightarrow{GaussianCenter})}$$

The weight of the image in the cluster is the sum of p(x) over all the Gaussians describing this cluster:

$$w_c = \sum_{i=1}^{NumberOfGaussians} p(x) = \sum_{i=1}^{NumberOfGaussians} GaussianHeight_i \cdot e^{-(\vec{x} - \overrightarrow{GaussianCenter_i})^T GaussianMatrix_i^{-1} (\vec{x} - \overrightarrow{GaussianCenter_i})}$$

Then the image has weights $w_1, w_2 \ldots w_N$ in N clusters, the probability of the image belonging to cluster i is computed as:

$$g(i) = \frac{e^{w_i}}{\sum_{j=1}^{N} e^{w_j}}$$

With respect to the cost function, once the above model parameters have been listed, the model is trained to describe the provided training data well. A cross-entropy-based cost function is used, which measures the similarity between the expected "true" labels and the labels predicted by the model in a probabilistic fashion.

The training data is the collection of N queries $q_1 \ldots q_N$, M images $q_1 \ldots q_M$, and K labeled examples $\{a_k, b_k, t_k, w_k\}$, $k=1 \ldots K$, where $a_k$ is the query index, $b_k$ is the image index, $t_k$ is the truth for this labeled example, zero or one, and $w_k$ is the weight of this labeled example. The training process in the one converging to the minimum of the following cost function:

$$\min F(\vec{p}) = \min - A(\vec{p}) + C \cdot B(\vec{p})$$

and, $$B(\vec{p}) = \frac{\sum_{i=1}^{N} x_i \cdot \log\left(\frac{x_i}{\sum_{j=1}^{N} x_j}\right)}{\sum_{i=1}^{N} x_i} + \frac{\sum_{i=1}^{N} y_i \cdot \log\left(\frac{y_i}{\sum_{j=1}^{N} y_j}\right)}{\sum_{i=1}^{N} y_i}$$

where, $$x_c = \sum_{i=1}^{N} f(q_i)_c, \quad y_c = \sum_{i=1}^{M} g(d_i)_c$$

Here, p is the model parameters vector, encapsulating all the query-level and image-level model features, A(p) is the measure of model fit, B(p) is the measure of model saturation, and C is the regularization parameter.

In the model application phase (in contrast to the above described model training phase), the combined model 216 is applied to the user data, which occurs on each user query. This phase can have strict upper bounds on the computational complexity (e.g., this phase is completed in a very short amount of time, before the user sees the search results, and scales to a large number of user issued search queries simultaneously). Therefore, this phase may only have access to a very restricted, carefully preprocessed data. For example, there is no performant way to access the full "truth" data corpus during user query time.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
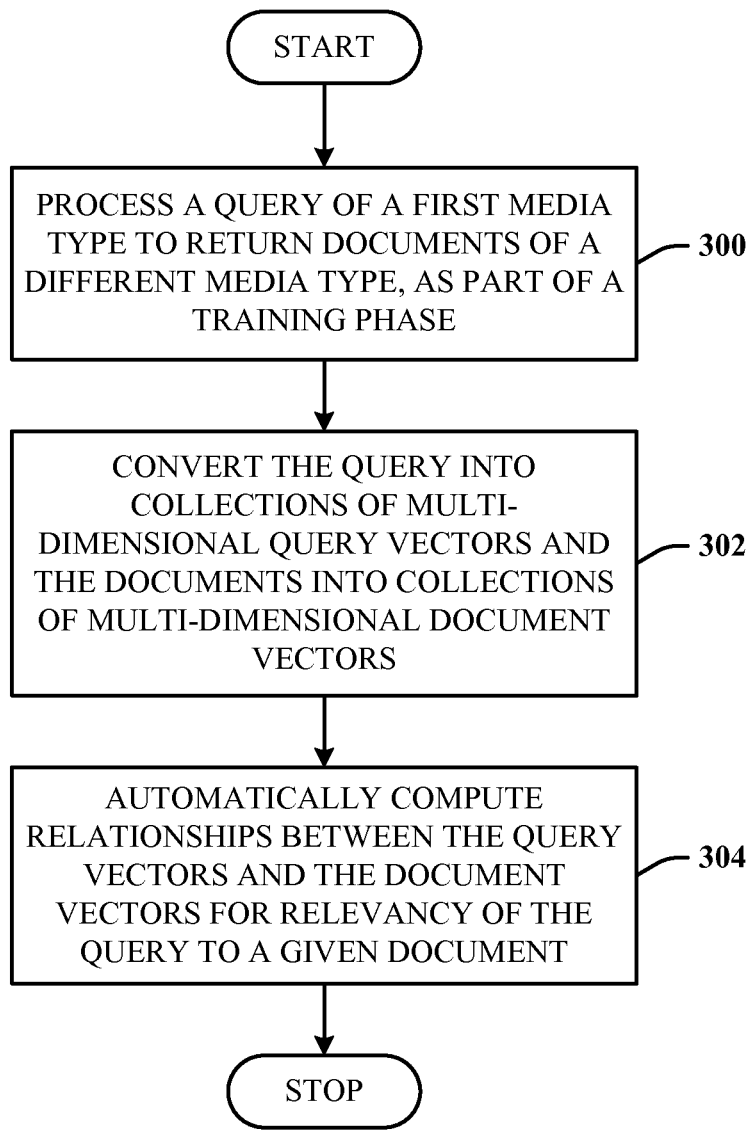
FIG. 3 illustrates a method in accordance with the disclosed architecture.

FIG. 3 illustrates a method in accordance with the disclosed architecture. At 300, a query of a first media type is processed to return documents of a different media type, as part of a training phase. At 302, the query is converted into collections of multi-dimensional query vectors and the documents are converted into collections of multi-dimensional document vectors. At 304, relationships are automatically computed between the query vectors and the document vectors for relevancy of the query to a given document.

Figure 4:
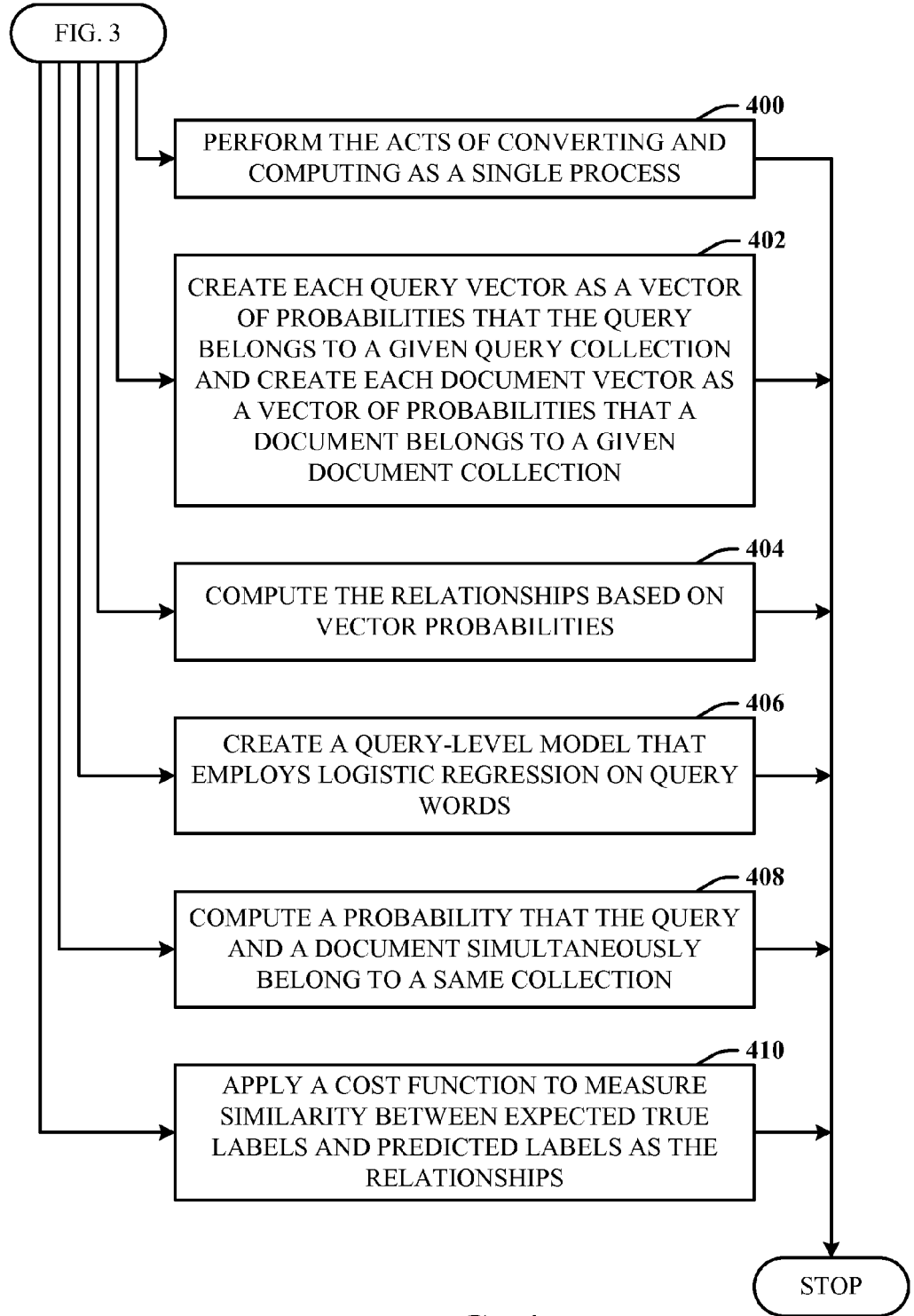
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, the acts of converting and computing are performed as a single process. At 402, each query vector is created as a vector of probabilities that the query belongs to a given query collection and each document vector is created as a vector of probabilities that a document belongs to a given document collection. At 404, the relationships are computed based on vector probabilities. At 406, a query-level model is created that employs logistic regression on query words. At 408, a probability is computed that the query and a document simultaneously belong to a same collection. At 410, a cost function is applied to measure similarity between expected true labels and predicted labels as the relationships.

Figure 5:
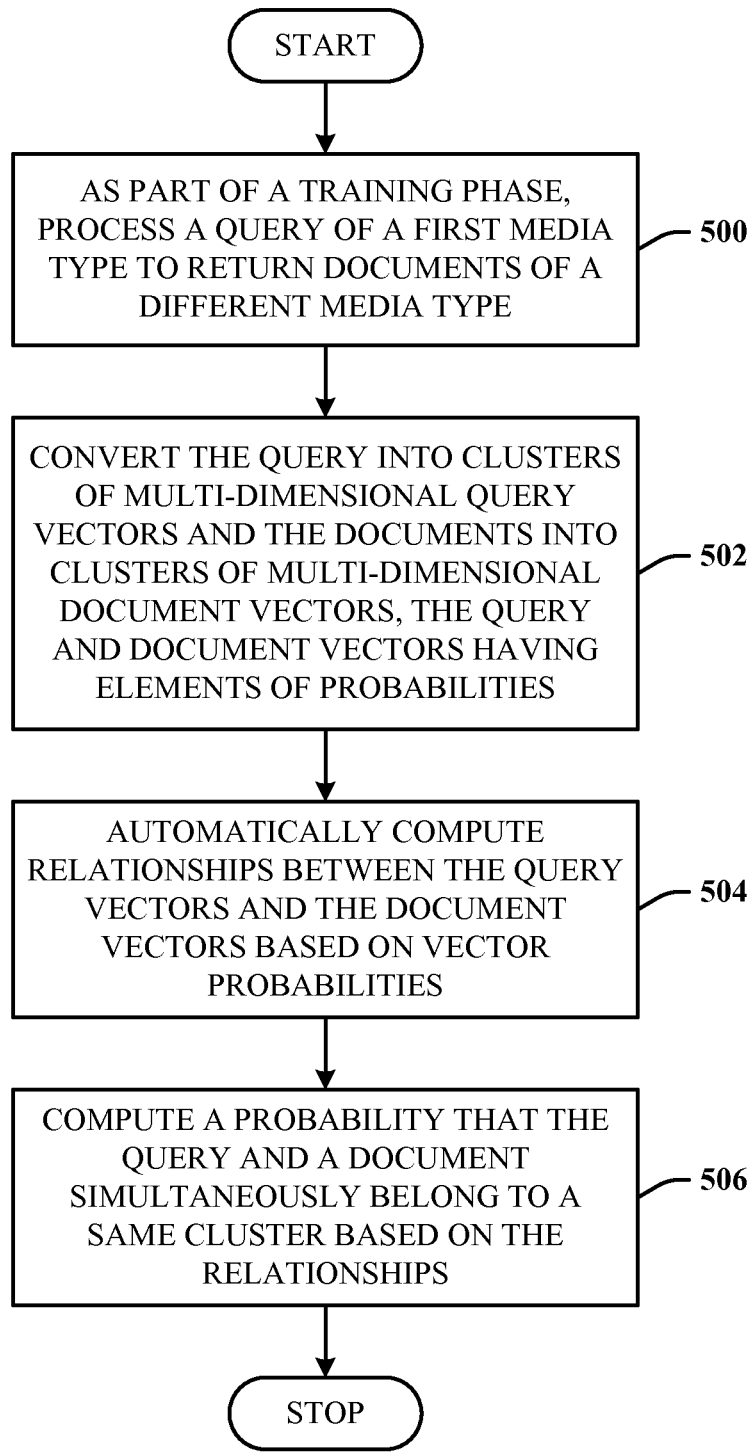
FIG. 5 illustrates an alternative method in accordance with the disclosed architecture.

FIG. 5 illustrates an alternative method in accordance with the disclosed architecture. At 500, a query of a first media type is processed to return documents of a different media type. At 502, the query is converted into clusters of multi-dimensional query vectors and the documents are converted into clusters of multi-dimensional document vectors, the query and document vectors having elements of probabilities. At 504, relationships are automatically computed between the query vectors and the document vectors based on vector probabilities. At 506, a probability is computed that the query and a document simultaneously belong to a same cluster based on the relationships.

Figure 6:
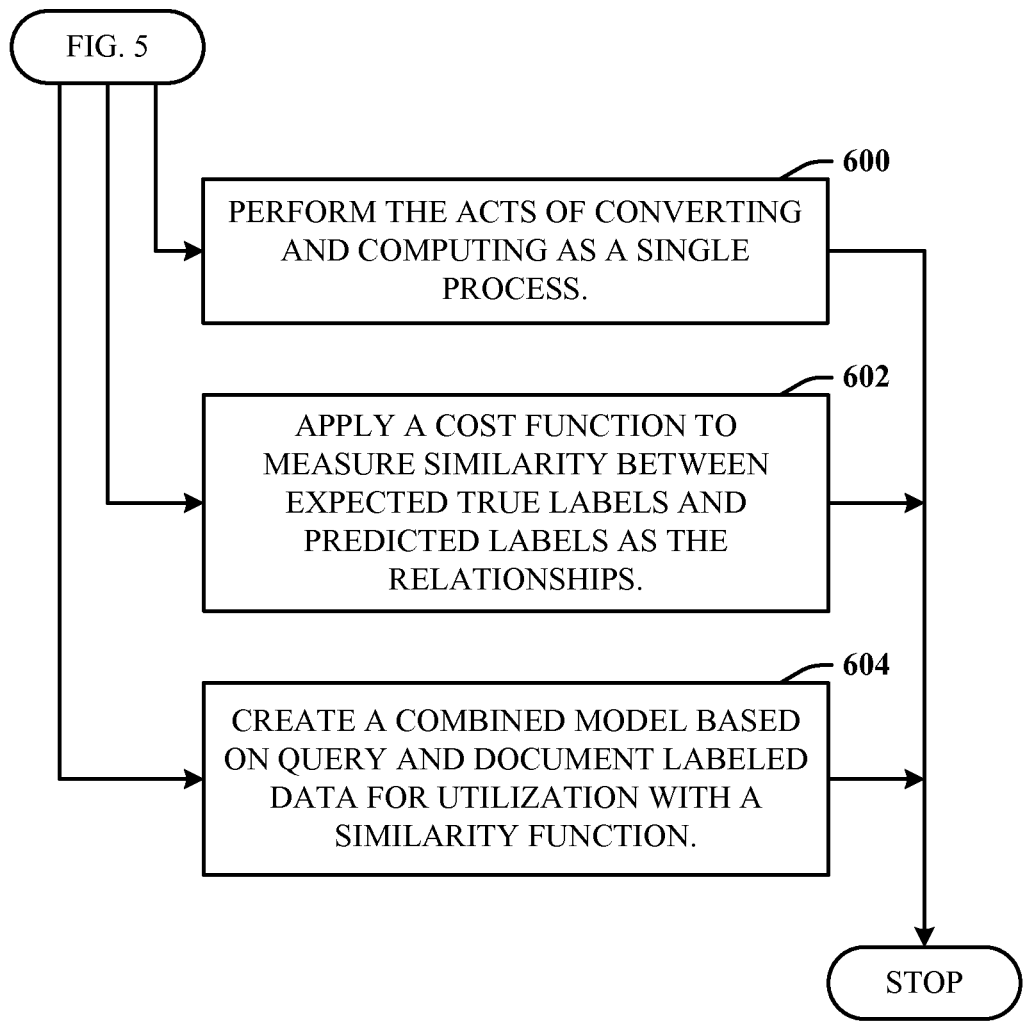
FIG. 6 illustrates further aspects of the method of FIG. 5.

FIG. 6 illustrates further aspects of the method of FIG. 5. Note that the flow indicates that each block can represent a step that can be included, separately or in combination with other blocks, as additional aspects of the method represented by the flow chart of FIG. 5. At 600, the acts of converting and computing are performed as a single process. At 602, a cost function is applied to measure similarity between expected true labels and predicted labels as the relationships.

At 604, a combined model is created based on query and document labeled data for utilization with a similarity function.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
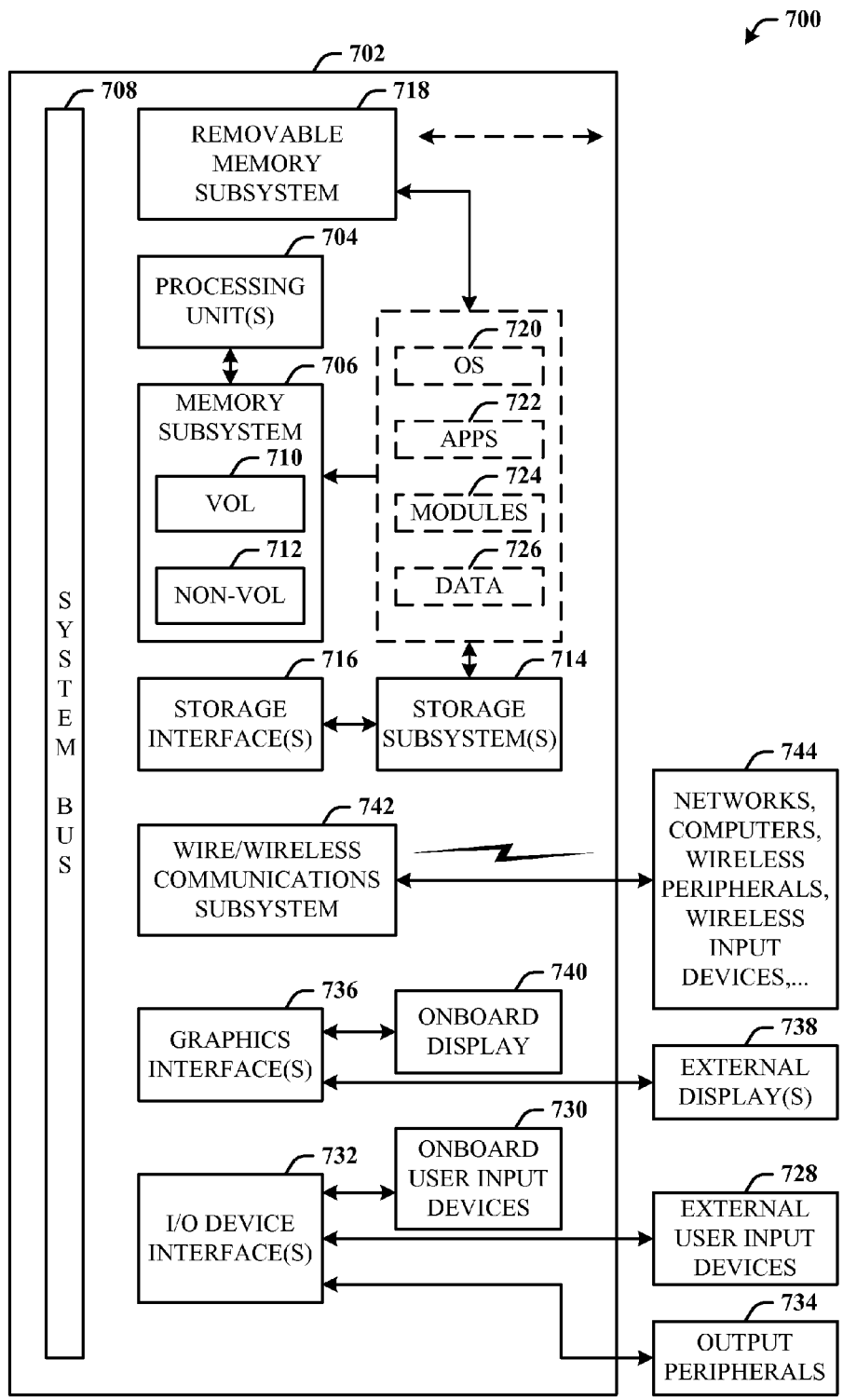
FIG. 7 illustrates illustrated a block diagram of a computing system that executes relationship determination between collections of disparate media types in accordance with the disclosed architecture.

Referring now to FIG. 7, there is illustrated a block diagram of a computing system 700 that executes relationship determination between collections of disparate media types in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include the entities and components of the system 100 of FIG. 1, entities and components of the system 200 of FIG. 2, and the methods represented by the flowcharts of FIGS. 4-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a relationship component that automatically determines relationships between disparate collections of media types, the collections and relationships computed in a single process and employed as part of processing a query to return documents at query time, the relationship component computing vectors for the collections, the vectors including query vectors and document vectors both of which are generated based on a collection-wise probabilistic algorithm and are processed with a similarity function to create a combined model of query-document labeled data; and
a processor that executes computer-executable instructions associated with at least the relationship component,
wherein the relationship component employs a cost function that defines the relationships between the disparate collections of media based on truth data, the defined relationships being usable in the processing of a query, and
wherein the collections are clusters that are concurrently created as query clusters and document clusters, and the relationship component computes the relationships between the query clusters and document clusters.

2. The system of claim 1, wherein the query is of a media type that is different from a media type of the documents.

3. The system of claim 1, wherein the disparate collections include a text media type as the query and an image media type as the documents.

4. The system of claim 1, wherein the cost function minimizes cross-entropy and KL-divergence to create the combined model of query-document labeled data.

5. The system of claim 1, wherein the relationship component computes vectors for both query collections and document collections, elements of the vectors being probabilistic data that a given query and document belong to a common collection.

6. The system of claim 1, wherein the system returns documents that are images, and
wherein the processing a query includes processing respective second-order image features that are invariant with respect to a size of the image.

7. The system of claim 1, wherein the number of clusters is fixed, wherein the queries and documents are projected into a probabilistic space of N clusters, and wherein respective functions are used map the queries and documents into a simplex of a dimension N.

8. A system, comprising:
a relationship component that automatically determines relationships between disparate collections of media types, the collections and relationships computed in a single process and employed as part of processing a query to return documents at query time, the relationship component computing a total weight of each query in a query collection, and a probability that the query belongs in a given query collection; and
a processor that executes computer-executable instructions associated with at least the relationship component,
wherein the relationship component employs a cost function that defines the relationships between the disparate collections of media based on truth data, the defined relationships being usable in the processing of a query, and
wherein the collections are clusters that are concurrently created as query clusters and document clusters, and the relationship component computes the relationships between the query clusters and document clusters.

9. A system, comprising:
a relationship component that automatically determines relationships between disparate collections of media types, the collections and relationships computed in a single process and employed as part of processing a query to return documents at query time, the relationship component computing a total weight of each document in a document collection, and a probability that the document belongs in a given document collection; and
a processor that executes computer-executable instructions associated with at least the relationship component,
wherein the relationship component employs a cost function that defines the relationships between the disparate collections of media based on truth data, the defined relationships being usable in the processing of a query, and
wherein the collections are clusters that are concurrently created as query clusters and document clusters, and the relationship component computes the relationships between the query clusters and document clusters.

10. A method, comprising:
processing a query of a single, first media type to return documents of a different media type, as part of a training phase;
converting the query into collections of multi-dimensional query vectors and the documents into collections of multi-dimensional document vectors;
automatically computing relationships between the query vectors and the document vectors for relevancy of the query to a given document;
computing the relationship based on vector probabilities; and
utilizing a processor that executes instructions stored in memory to perform at least one of the acts of processing, converting, or computing.

11. The method of claim 10, further comprising performing the acts of converting and computing as a single process.

12. The method of claim 10, further comprising creating each query vector as a vector of probabilities that the query belongs to a given query collection and creating each document vector as a vector of probabilities that a document belongs to a given document collection.

13. The method of claim 10, further comprising creating a query-level model that employs logistic regression on query words.

14. The method of claim 10, further comprising computing a probability that the query and a document simultaneously belong to a same collection.

15. The method of claim 10, further comprising applying a cost function to measure similarity between expected true labels and predicted labels as the relationships.

16. The method of claim 15, wherein the cost function to measure similarity between expected true labels and predicted labels is performed using cross-entropy and KL-divergence functions.

17. A method, comprising:
as part of a training phase, processing a query of a single, first media type to return documents of a different media type;
converting the query into clusters of multi-dimensional query vectors and the documents into clusters of multi-dimensional document vectors, the query and document vectors having elements of probabilities;
automatically computing relationships between the query vectors and the document vectors based on vector probabilities;
computing a probability that the query and a document simultaneously belong to a same cluster based on the relationships;
applying a cost function to measure similarity between expected true labels and predicted labels as the relationships; and
utilizing a processor that executes instructions stored in memory to perform at least one of the acts of processing, converting, computing relationships, or computing a probability.

18. The method of claim 17, further comprising performing the acts of converting and computing as a single process.

19. The method of claim 17, further comprising creating a combined model based on query and document labeled data for utilization with a similarity function.

20. The method of claim 17, wherein the cost function to measure similarity between expected true labels and predicted labels is performed using cross-entropy and KL-divergence functions.

* * * * *